United States Patent [19]

Edlinger

[11] Patent Number: 6,106,587
[45] Date of Patent: Aug. 22, 2000

[54] PROCESS FOR SEPARATING TIN AS WELL AS, IF REQUIRED, COPPER FROM SCRAP MELTS, IN PARTICULAR, TINPLATE MELTS OR METALLIC MELTS

[75] Inventor: Alfred Edlinger, Baden, Switzerland

[73] Assignee: "Holderbank" Financiere Glarus AG, Glarus, Switzerland

[21] Appl. No.: 09/068,062

[22] PCT Filed: Sep. 9, 1997

[86] PCT No.: PCT/AT97/00196

§ 371 Date: May 5, 1998

§ 102(e) Date: May 5, 1998

[87] PCT Pub. No.: WO98/11263

PCT Pub. Date: Mar. 19, 1998

[30] Foreign Application Priority Data

Sep. 10, 1996 [AT] Austria .................................. 529/96 U
Jun. 23, 1997 [AT] Austria .................................. 385/97 U

[51] Int. Cl.[7] .............................. C22B 25/06; C21B 13/14
[52] U.S. Cl. .................................. 75/532; 75/561; 75/562; 75/581; 75/646; 75/690; 75/706; 423/37; 423/88; 423/90

[58] Field of Search .............................. 75/690, 646, 706, 75/532, 581, 561, 562; 423/37, 88, 90

[56] References Cited

U.S. PATENT DOCUMENTS 5,588,982 12/1996 Hendrix .................................. 75/10.15
5,902,375 5/1999 Ishida et al. .............................. 75/690

*Primary Examiner*—Melvyn Andrews
*Attorney, Agent, or Firm*—Pilsbury Madison & Sutro LLP

[57] ABSTRACT

In a process for separating tin as well as, if required, copper from scrap melts, in particular, tinplate melts or metallic melts as formed in the working up of waste or metal-oxide-containing combustion residues, the carbon content of the melt is adjusted to 3 to 4.2% by weight and hot wind, oxygen or air enriched with oxygen is locally blown on partial regions of the surface of the melt bath, whereby SnO is discharged, via the gaseous phase, from the redox-gradient-exhibiting zone formed between the carbon-rich bath and the iron oxides produced by top-blowing.

20 Claims, No Drawings

PROCESS FOR SEPARATING TIN AS WELL AS, IF REQUIRED, COPPER FROM SCRAP MELTS, IN PARTICULAR, TINPLATE MELTS OR METALLIC MELTS

BACKGROUND OF THE INVENTION

1. Field of the Invention

The invention relates to a process for separating tin as well as, if required, copper from scrap melts, in particular, tinplate melts or metal-oxide-containing combustion residues.

2. Description of the Related Art

In the course of the working up of waste or of metal-oxide-containing combustion residues or slags, purification processes have already been proposed in which the slags are purified while forming an iron bath or by using an iron bath. Depending on the composition of the starting slags, such melts occurring as pig iron baths, contain more or less high portions of copper. However, copper contained in pig iron and, in particular, steel constitutes a metallurgical problem. Copper interferes with the production of flat products, such as, for instance, deep-drawing sheets. Steel works most frequently process only steel grades that must have copper contents of less than 0.1%. With longitudinal products, for instance beams and girders, structural steels or rails, slightly higher copper contents are admissible, though. Yet, also there the upper limit of the copper content most frequently is less than 0.4% by weight. Copper is introduced via scrap also in steel production processes, the amount of copper contained in steel increasing with the scrap recycling rate being raised.

From EP-707083 a process for working up waste or metal-oxide-containing metallic combustion residues has already become known, in which reduction was carried out after an at least partial oxidation of the melt to slag under separation of a metal bath. In the course of reduction, which may be effected, for instance, by blowing in carbon monoxide/carbon dioxide, copper is introduced into the iron bath, whereby nonferrous heavy metals may subsequently segregate in the form of crude bronze. After the segregation of crude bronze at a temperature of about 1500° C., crude copper having an iron content of approximately 4% by weight was formed, as a rule, yet relatively high contents of copper continued to remain within the iron bath. The remaining iron alloy typically contains approximately 8% by weight of copper.

From WO 96/24696 a process for producing pig iron or steel and cement clinker from slags has become known, in which a ferrite slag is formed and likewise is reduced in a reduction reactor while forming an iron bath and, in the sinter phase, while burning carbon. As in the first-mentioned process, the pig iron bath may subsequently be refined, it being possible that copper contents too high for a number of further applications remain in the steel. Even iron baths specifically employed for refining slags and, in particular, pig iron baths contain more or less high copper contents depending on the case histories of the slags.

Another problem of such metallic melts resides in their high contents of tin.

The tin content of steel usually ranges between 0.015 and 0.02% by weight in the steel. By extrapolation to scrap, tin contents of 0.1% by weight will, however, result, the presence of tin in such high amounts after scrap melting leading to products capable of being utilized to a limited extent only. This will apply all the more if tin plate melts are produced and, therefore, a simple and reliable process for separating tin is of substantial economic importance in order to obtain economically utilizable melting products.

Scrap melting processes and, in particular, tinplate melts, as a rule, hitherto have brought about products that may be utilized to a limited extent only and are no longer suitable for a number of applications. A tin content of above 500 ppm will result in markedly reduced strength and deformation properties of the product such that a simple and safe process or separating tin may substantially enhance the value of the melting product.

SUMMARY OF THE INVENTION

The invention aims at reducing in a particularly simple manner the tin content as well as, if required, the copper content of metallic melts or scrap melts, wherein, with a view to solving this object, it is proposed that the carbon content of the melt is adjusted to 3 to 4.2% by weight and that hot wind, oxygen or air enriched with oxygen is locally blown on partial regions of the surface of the melt bath, whereby SnO is discharged, via the gaseous phase, from the redox-gradient-exhibiting zone formed between the carbon-rich bath and the iron oxides produced by top-blowing.

DETAILED DESCRIPTION OF THE INVENTION

By adjusting the carbon content of the melt to 3 to 4.2% by weight, a reduction potential typical of pig iron is adjusted. By top-blowing hot wind or oxygen locally on partial regions of the surface of the melt bath, a redox gradient is formed between a locally developed iron oxide phase and the iron carbon of the bath, which redox gradient enables the selective oxidation of tin to bivalent tin and, in this manner, causes SnO to continuously evaporate out of equilibrium in the phase of the redox gradient between the iron oxide phase and the iron carbon because of the high vapor pressure of SnO. Iron oxide is, thus, continuously separated, wherein the regions above which such a separation of tin oxide is feasible in the bivalent stage are limited to a spherical cap surrounding the iron oxide phase and exhibiting a pronounced redox gradient. An accordingly high carbon content of the melt is required for maintaining this redox gradient, wherein it is feasible to withdraw from this zone formed between the iron oxide phase and the iron carbon, via the gaseous phase, also arsenic as a trivalent oxide ($As_2O_3$) besides SnO. The complete separation of tin, as a rule, is feasible at blowing times of below 20 minutes, As-III-oxides advantageously being withdrawable along with volatile SnO.

When using hot wind or air enriched with oxygen, it must, however, be safeguarded that no undesired nitrogen content increase of the bath occurs. According to a preferred further development of the invention, this is ensured in that hot wind is top-blown until the carbon content has burnt down to >0.5% by weight, whereupon refining is continued by aid of oxygen or air enriched with oxygen.

In order to guarantee the redox gradient required for the safe production of SnO, the invention advantageously contemplates to proceed in a manner that the carbon content of the bath during the local top-blowing of oxygen is maintained at 3 to 4.2% by weight by blowing in carbon or carbon carriers. The oxygen or air lance in that case is directed to a burning spot ensuring the formation of the redox-gradient-exhibiting transition zone to the surrounding iron carbon. The adjustment and maintenance of the respective carbon content ensures the respective redox gradient over the total blowing time and hence the safe separation of evaporating SnO from the transition zone, the metallically present tin being oxidizable to SnO in a selective and quantitative manner.

The process according to the invention advantageously is carried out in a manner that oxygen is fed via a top-blowing lance and carbon is introduced via bottom tuyeres of a converter, wherein it is advantageously proceeded in a manner that the zone exhibiting the redox gradient is maintained until the tin content has been depleted to below 500 ppm.

By adjusting the melt to a high carbon content, which may come close to the degree of saturation of carbon in iron, a phase separation is feasible already previously with the presence of a high copper content, it being advantageously proceeded in a manner that, prior to evaporating SnO, copper is separated by phase separation of a melt saturated with carbon, whereupon the iron-rich phase formed is subjected to tin separation. The high carbon content causes the formation of the two phases which enable the substantial depletion of copper, if required. Further undesired copper advantageously may subsequently be removed in that a separation of copper is effected after the separation of tin, by introducing sulphur into the metal melt.

The melt temperature, in particular with tinplate melts and at a carbon content of approximately 4.2% by weight, amounts to about 1350° C. In the zone of impingement of the oxygen jet of the oxygen lance, or of the air enriched with oxygen, iron-II- and also iron-III-oxides are formed in the first place, which, together with the carbon contained in the iron subsequently give rise to the formation of the required zone exhibiting a redox gradient, in the surrounding of the burning spot of the lance, thus, in turn, ensuring the safe oxidation of metallic tin to SnO and hence its separation via the gaseous phase.

Economic operation of the process is, of course, feasible if cheap coal grades, such as, for instance, highly sulphur-containing pet coke, a carbon-containing residue from crude oil distillation having a sulphur content of about 7% by weight, are used for melting and, in particular, melting down scrap. The resulting high sulphur introduction may directly be used to reduce the content of copper. In order to effectively decopperize melts loaded with copper, it is advantageously proceeded in a manner that the copper matte formed during melting with sulphur-containing carbon carriers is drawn off the iron bath at temperatures of above 1400° C., in particular about 1500° C.

If high-quality coal is used or too low an amount of sulphur is introduced, it is advantageously proceeded in a manner that sulphur in an at least stoichiometric amount, based on copper, is introduced or applied, whereupon the liquid $Cu_2S$ (copper matte) phase formed is drawn off.

By sulphur being introduced into, or applied onto, the bath, copper matte is formed and can be drawn off. The amount of sulphur introduced into the pig iron or steel melt during feeding or application may subsequently be eliminated again by conventional desulphurization, additional synergistic effects being thereby obtainable, in particular, in the production of puzzolanic slags or clinkers.

As already described in EP-707083, it is feasible in case of pig iron melts rich in carbon to effect phase separation in a first step. Taking into account the amounts of copper that remain in the phase rich in iron and poor in copper, it will do in such cases to supplement the iron-rich phase with sulfur in order to thereby reduce the overall introduction of sulphur. Advantageously, the process according to the invention, therefore, is carried out in that the melts rich in iron are saturated with carbon or used as pig iron baths, whereupon, in a first process step, a phase separation into a phase rich in iron and containing copper in amounts of from 0.5 to 2% by weight and a phase rich in copper and containing residual iron in amounts of less than 10% by weight is effected, whereupon the iron-rich phase is supplemented with sulfur and the $Cu_2S$ phase floating thereon is drawn off.

The introduction of sulfur may be effected in a particularly simple manner in the form of sulphur vapor. Advantageously, the process according to the invention is carried out in a manner that sulfur in the form of sulfur vapor is introduced in an overstoichiometric amount, based on copper, sulfur vapor preferably being used in an amount exceeding the stoichiometric amount, based on copper, by a factor 1.5 to 2.5.

Desulfurization of the iron or steel bath after tapping of the copper sulfide phase may be realized in a simple manner in that $CaC_2$ and/or MgO are used for desulfurization the metal bath. Advantageously, clinker, puzzolanic slag or waste incineration slag having a basicity ($CaO/SiO_2$) of between 1.3 and 1.7 is, however, used for desulfurization, such a mode of procedure having the advantage that clinker or puzzolanic slag incorporate the sulphur from the pig iron bath practically quantitatively into the clinker structure. Such a mode of procedure is advantageous from a cement-technological point of view, because thereby the addition of gypsum may be reduced in the production of cement.

In a particularly simple manner, the sulfur may be introduced by means of submerged tuyeres.

The addition of elementary sulfur to steel, which, as mentioned in the beginning, preferably is to be effected at least stoichiometrically, based on the Cu content of the steel, causes the formation of $Cu_2S$ droplets. Being lighter than the steel melt, such copper matte droplets will float on the surface of the steel. Copper matte may, therefore, be readily withdrawn in the liquid form, the residual liquid copper matte that remains in the liquid steel segregating in the solidified steel as a micro-inhomogeneity. Such micro-inhomogeneities in subsequent deep-drawing do not display any adverse effects, nor do they form any electrochemical local elements, the corrosion of steel, thus, being reduced. In the desulfurization of steel it is, however, necessary to maintain temperatures in the order of 1650° C., whereas an accordingly lower temperature level may be chosen after carburization or after charging of pig iron. A temperature level of about 1500° C. at the beginning is sufficient for the desulphurization of pig iron. The solubility of liquid copper in molten pig iron is lowered by carbon, thereby enabling the formation of a two-phase melt at an appropriately high carbon content. At an appropriately high carbon content, a phase rich in iron and containing about 1% by weight of copper as well as a phase rich in copper and containing about 6% by weight of iron may be formed, the two phases being readily separable from each other by decanting at approximately 1500° C. Pig iron fractions as may be used in the realization of the present invention typically have copper contents ranging between 0.1 and 8% by weight.

The copper-rich fraction drawn off may be delivered to a primary copper mill at a contribution margin. The iron-rich fraction subsequently may be decopperized by sulphurization, whereby iron-containing copper sulfide will float on the pig iron bath and may be drawn off. Also this copper sulfide, in principle, may be delivered to a primary mill at a low contribution margin.

The pig iron left, as a rule, has a relatively high sulfur content in the order of some weight percentage. A typical sulfur content amounts to about 2% by weight. Desulfurization is feasible in a conventional manner under basic and reducing conditions, for instance, by means of calcium carbide or magnesium, whereupon refining to steel may be effected after this. If clinker or puzzolanic slags are used to desulphurize the pig iron bath, sulfur contents of less than 60 ppm may readily be obtained in the pig iron.

Devices common in secondary metallurgy, such as flushed ladles, as well as RH or DH processes may be employed in the sulphurizing process. The introduction of sulfur vapor may be effected in a simple manner through submerged tuyeres.

In particular, when using clinker phases or liquid puzzolanic slags or a waste incineration slag having a basicity ($CaO/SiO_2$) of between 1.3 and 1.7, improvement of the cement-technological properties is achieved simultaneously with the desulfurization of the pig iron bath, since the binding of sulphur within the clinker brings about a number of advantages as mentioned above.

In the following, the invention will be explained in more detail by way of an exemplary embodiment.

Steel scrap was melted down in a KS converter (bottom-blowing converter from the "OBM family") under the continuous bottom-blowing of cheap highly sulfur-containing pet coke (carbon-containing residue from crude oil distillation having a sulfur content of about 7%). The starting analysis of the steel scrap (waste scrap, tinplate cans) revealed the following values:

| Element | Portion (%) |
|---------|-------------|
| P | 0.13 |
| S | 0.18 |
| Cu | 1.82 |
| Cr | 0.18 |
| Ni | 0.08 |
| Sn | 0.15 |
| Pb | 0.12 |
| Zn | 0.34 |
| Fe | balance |

An iron melt saturated with carbon to the major extent (about 3.2% C) was obtained at approximately 1350° C.

A "copper matte", in which nickel and iron were dissolved in addition to copper, was formed on account of the sulfur introduced by means of pet coke.

Copper matte is a highly liquid complex sulfide comprised of Fe, Cu, Ni and traces of other metals ("sulfide formers"). The metals Zn, Pb as well as some phosphorus pass into the gaseous phase.

The copper matte was drawn off the iron bath at approximately 1500° C. The pig iron left still had a Cu content of about 500 ppm.

Then, desulfurization to about 1000 ppm sulfur was carried out in the iron bath by means of slag obtained from waste incineration ($CaO/SiO_2$ between 1.3 and 1.7).

After this, the thus desulfurization iron bath was "detinned" by means of a hot wind jet (1100° C.). About 30 to 90 $Nm^3$ of hot air were required per ton of pig iron. The detinning procedure was completed within 10 to 20 minutes. The final tin content of the thus obtained pig iron was below 200 ppm. The pig iron melt had a bath temperature of from 1450 to 1550° C., the final carbon content amounting to about 1.5%.

By means of hot air, refining was effected until a carbon content of 0.5%. "Final refining" was carried out by an LD or OBM process with technically pure oxygen in order to obtain final nitrogen contents as low as possible in the crude steel.

What is claimed is:

1. A process for separating tin, and optionally copper, from metallic scrap melts containing at least tin, iron, and optionally copper, said process comprising:

melting the metallic scrap to form a melt bath having a surface and disposing the melt bath in a converter having bottom tuyeres;

maintaining the melt at a carbon content of 3% by weight to 4.3% by weight to form an iron carbon phase in the melt bath;

blowing hot air, oxygen, or air enriched with oxygen at localized burning regions on the surface of the melt bath to produce an iron oxide phase in the melt bath;

forming a redox-gradient-exhibiting transition phase in the melt bath between the iron carbon phase and the iron oxide phase;

oxidizing tin in the redox-gradient-exhibiting transition phase of the melt bath to form SnO; and evaporating the SnO into gaseous SnO and discharging the gaseous SnO from the melt bath.

2. The process of claim 1, said blowing comprises blowing hot air until the carbon content of the melt bath has burnt down to >0.5% by weight, and thereafter refining with oxygen or air enriched with oxygen.

3. The process of claim 1, wherein the metallic scrap melt includes arsenic, and wherein said process further comprises drawing off As-III-oxides with the gaseous SnO from the melt bath.

4. The process of claim 1, wherein said maintaining of the carbon content comprises adjusting the carbon content to 3% by weight to 4.2% by weight by blowing into the melt bath carbon or carbon carriers.

5. The process of claim 4, wherein said blowing of hot air, oxygen, or air enriched with oxygen is conducted through a top-blowing lance, and wherein the carbon or carbon carriers are introduced through the bottom tuyeres.

6. The process of claim 5, further comprising maintaining the redox-gradient-exhibiting transition phase until the redox-gradient-exhibiting transition phase has a tin content depleted to below 500 ppm.

7. The process of claim 5, further comprising separating copper from the iron oxide phase by phase separation prior to said evaporating of the SnO, and thereafter performing said discharging of the gaseous SnO from the melt bath.

8. The process of claim 5, further comprising separating copper from the iron oxide phase by introducing sulfur into the metal melt either before or after said discharging of the gaseous SnO from the melt bath.

9. The process of claim 8, further comprising forming the metallic scrap melt by melting metallic scrap while charging sulfur-containing coal or coke into the metallic scrap.

10. The process of claim 9, further comprising drawing off the sulfur-containing coal or coke from the metal bath at temperatures of above 1400° C.

11. The process of claim 9, further comprising drawing off the sulfur-containing coal or coke from the metal bath at temperature of above 1500° C.

12. The method of claim 9, wherein sulfur introduced with the sulfur-containing coal or coke is present in at least a stoichiometric amount based on copper so that a liquid $Cu_2S$ phase is produced, and wherein said process further comprises drawing off the liquid $Cu_2S$ phase from the melt bath.

13. The method of claim 5, further comprising:

phase separating the melt bath into a first phase rich in iron and containing copper in an amount of from 0.5% by weight to 2% by weight and a second phase rich in copper and containing residual iron in amounts less than 10% by weight;

introducing sulfur into the first phase to produce a liquid $Cu_2S$ phase; and drawing off the liquid $Cu_2S$ phase from the melt bath.

14. The process of claim 8, wherein the sulfur introduced into the metal melt is sulfur vapor introduced in more than a stoichiometric amount, based on the amount of copper.

15. The process of claim 14, wherein said introducing of sulfur into the metal melt comprises introducing the sulfur vapor in an amount exceeding stoichiometric, based on copper, by a factor of 1.5 to 2.5.

16. The process of claim 12, further comprising de-sulfurizing the melt bath after said drawing off of the liquid $Cu_2S$ phase.

17. The process of claim 16, wherein said de-sulfurizing is performed with at least one member selected from the group consisting of $CaC_2$ and MgO.

18. The process of claim 16, wherein said de-sulfurizing is performed with clinker, pozzolanic slag, or waste incineration slag having a basicity ($CaO/SiO_2$) between 1.3 and 1.7.

19. The process of claim 17, wherein said de-sulfurizing is further performed with clinker, pozzolanic slag, or waste incineration slag having a basicity ($CaO/SiO_2$) between 1.3 and 1.7.

20. The process of claim 8, wherein the sulfur is introduced through the bottom tuyeres.

* * * * *